REISSUED MAR. 31, 1868.

No. 2,909.

J. S. & I. ROWELL.
CULTIVATOR.

WITNESSES.

Solon C. Kemon
Chas. A. Pettit

INVENTORS.

J. S. & I. Rowell
By Munn & Co
Attorneys

UNITED STATES PATENT OFFICE.

JOHN S. ROWELL AND IRA ROWELL, OF BEAVER DAM, WISCONSIN.

IMPROVEMENT IN CULTIVATORS.

Specification forming part of Letters Patent No. 56,102, dated July 3, 1866; Reissue No. 2,909, dated March 31, 1868.

*To all whom it may concern:*

Be it known that we, JOHN S. ROWELL and IRA ROWELL, of Beaver Dam, in the county of Dodge and State of Wisconsin, have invented a new and Improved Cultivator; and we do hereby declare the following to be a full, clear, and exact description of the same, sufficient to enable those skilled in the art to which our invention appertains to make use of it, reference being had to the accompanying drawings, forming part of this specification, in which—

Figure 1:
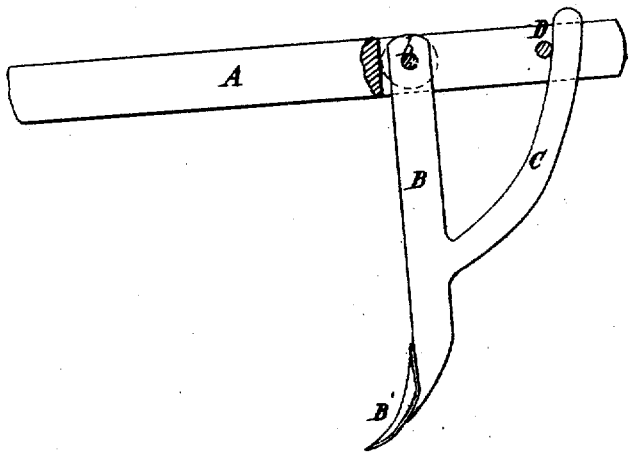
Figure 2:
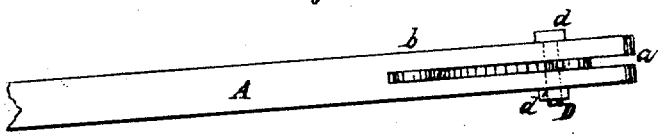

Figure 1 is a side elevation of the tooth in a beam, shown in longitudinal section. Fig. 2 is a top view of the beam with the tooth in position.

The invention consists in applying to the shank of the tooth a curved brace-bar, the upper end of which passes through a slot or mortise in the beam and is held in position by a clamping-bolt, which passes transversely through the slot or mortise near the brace-bar, and forces the sides of the beam together against the brace-bar, so as to clamp it in any required position, and thereby adjust the tooth in any inclination, at the same time allowing it to yield to immovable obstacles without breaking.

In the drawings, A represents one of the beams of a cultivator; B, the shank pivoted at *b*; B′, the tooth; C, a curved brace-bar extending in the arc of a circle outward and upward from the rear side of the shank B, and its upper end passing vertically through a longitudinal slot or mortise, *a*, in the beam A; and D, a bolt passing transversely through the slot or mortise, and having a head, *d*, on one end and a nut, *d′*, on the other, by which the side walls of the slot or mortise can be clamped against the brace-bar with any required force, thereby holding the latter in position when operating in the field.

It is evident that in a device thus constructed and operating the brace-bar C can be so clamped that the tooth will retain its position when working in arable soil, but will yield when coming in contact with an immovable obstacle and pass over it without breaking, the shank turning back upon its pivot *b*, and the brace-bar being forced up through the slot. The same arrangement also allows the shank to be adjusted in any position for deep or shallow cultivating.

The device above described may be cheaply applied, is of very simple construction, and has been found more effective practically than other devices designed to operate in a similar way.

Having thus described our invention, what we claim as new, and desire to secure by Letters Patent, is—

The combination of the slotted beam A, shank B, brace-bar C, and bolt D, when the parts are constructed and arranged to operate as and for the purposes herein specified.

JOHN S. ROWELL.
IRA ROWELL.

Witnesses:
J. E. HOSMER,
C. S. SNOW.